United States Patent [19]
Jeter

[11] Patent Number: 5,473,579
[45] Date of Patent: Dec. 5, 1995

[54] WELL BORE COMMUNICATION PULSER

[75] Inventor: John D. Jeter, St. Martinville, La.

[73] Assignees: Ronald L. Shaw, Youngsville; Clyde Cormier, Church Point, both of La.

[21] Appl. No.: 140,437

[22] Filed: Oct. 25, 1993

[51] Int. Cl.$^6$ .................................................. G01V 1/40
[52] U.S. Cl. .................... 367/85; 367/83; 175/50
[58] Field of Search .................... 367/85, 83; 175/48, 175/50; 173/14

[56] References Cited

U.S. PATENT DOCUMENTS

| | | | |
|---|---|---|---|
| 4,386,422 | 5/1983 | Mumby et al. | 367/85 |
| 4,553,226 | 11/1985 | Scherbatskoy | 367/85 |
| 4,825,421 | 4/1989 | Jeter | 367/83 |
| 5,103,430 | 4/1992 | Jeter et al. | 367/85 |

*Primary Examiner*—Nelson Moskowitz

[57] ABSTRACT

A well communication pulser is solenoid controlled but energized by an actuator responsive to the pressure drop across the signal valve. The signal valve is spring biased toward a closed state but the actuator urges it toward an open state with a force proportional to the pressure drop. When in the off-pulse state the spring is sized to yield an operating pressure for the pulser. A servo valve controls pressure admitted to the actuator to cause it to move to the on-pulse state to develop signal pressure. The servo valve is spring biased open to cause a pressure signal to be generated but it has a second actuator responsive to the pressure drop which will overcome the servo opening spring and move the servo to the off-pulse, or closed, state. The pulser would oscillate continually between the two states but a solenoid controlled latch automatically secures the servo when it arrives at either state. The latch will release the servo valve in response to signals from the down hole instrument allowing the instrument to encode time distributed changes of state detectable at the surface to decode the information from the instrument.

11 Claims, 2 Drawing Sheets

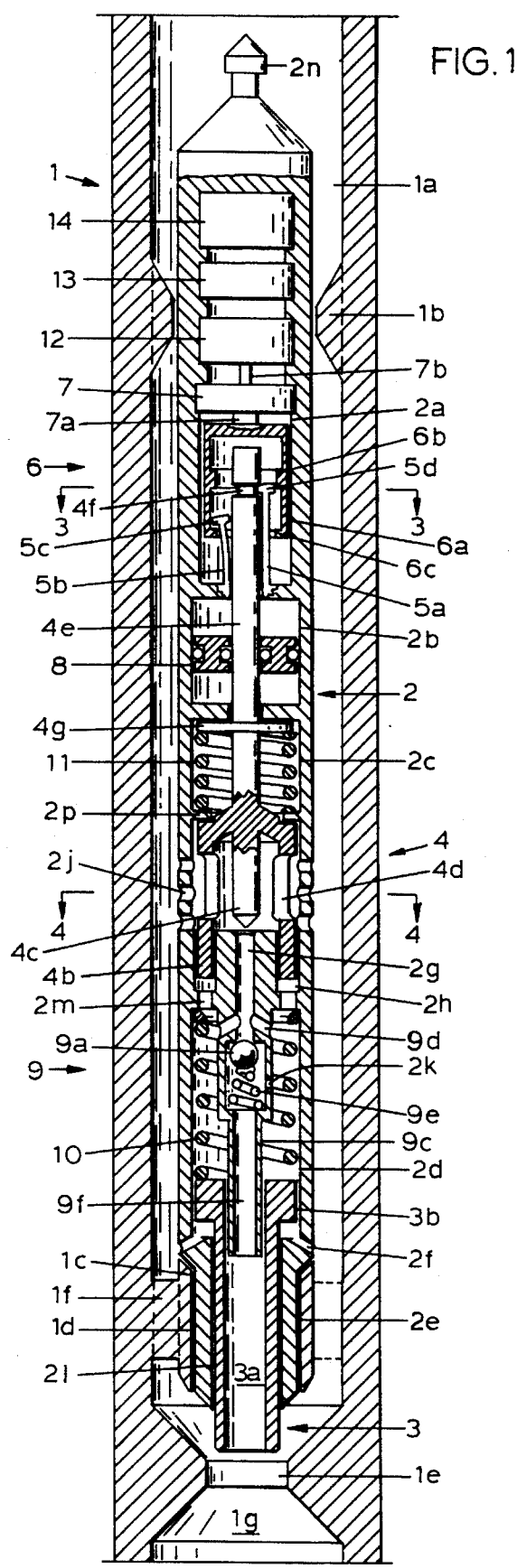
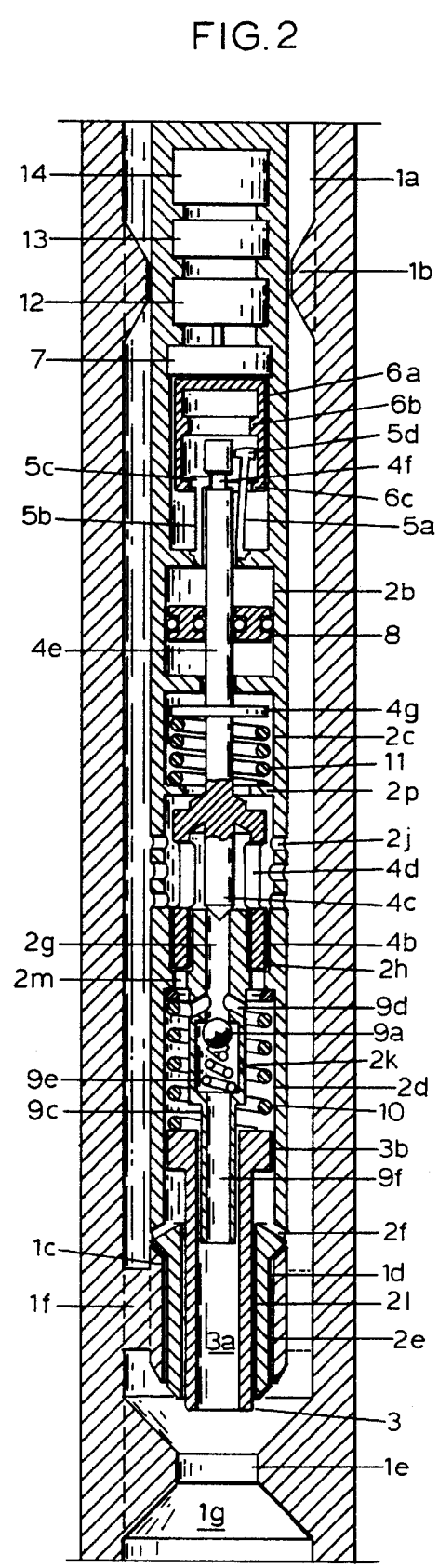

WELL BORE COMMUNICATION PULSER

This invention pertains to pulse generators used to create communication signal pressure pulses in the drilling fluid stream pumped down the bore of a drill string suspended in a well bore. Pulses are generated in response to an instrument situated down hole near the pulser to produce time distribution coded signals detectable at the earth surface for decoding to determine the information produced by the instrument.

BACKGROUND OF THE INVENTION

The use of well bore signals for well logging and general communication of signals along the drill string bore is well established in an art usually referred to as Measurement While Drilling (MWD). It may be used with any pipe string in the well bore whether drilling or not and usually involves the same equipment and technique without changing the definition.

There are two general classifications of down hole pulsers, those installed in the drill string and those, called shuttle pulsers, transportable through the drill string bore to and from the down hole location. The installed version is assembled into the drill string at the surface while the down hole assembly is out of the well and can only be removed when the string is tripped. The shuttle pulser normally requires a housing that is part of the drill string and usually includes a shuttle locator and an orifice and that housing is installed while the down hole assembly is at the surface.

The pulser requires some form of power for operation. The down hole instrument requires power for instrument driving and signal processing. The pulser valve that creates the pressure pulse in the drilling fluid consumes a considerable amount of power. The installed pulser rarely operates on batteries alone and usually has a mud powered motor driving an electric generator of some form to power at least the instrument. In some cases the motor drives a hydraulic pump to provide signal valve operating power. All known shuttle pulsers operate on battery power alone. Powering the signal valve directly by batteries is not practical because batteries now available for the limited space in the shuttle would have a very short life.

The drilling fluid stream moving in the drill string bore has rather massive capability as a power source to drive the signal valve without significant drain upon the main purpose for the drilling fluid stream. Both forms of modern pulsers use the mud stream to derive power for the valve with only minimal power use from batteries for valve control. It is the derivation of power from the mud stream and the efficient utilization of electric power for valve control that this invention addresses.

It is therefore an object of this invention to provide apparatus to utilize the difference, in pressure drop across the signal valve, between the on-pulse and off-pulse states of the signal valve to provide the power to operate the signal valve.

It is another object of this invention to utilize the power derived from any change of state of the signal valve to power the next change of state of the signal valve.

It is yet another object to provide automatic locking means to secure the signal valve in each state until a signal for change of state is received from the controlling down hole instrument.

It is still a further object to provide means to regulate the pressure differential across the signal to a preselected amount.

These and other objects, advantages, and features of this invention will be apparent to those skilled in the art from a consideration of this specification, including the attached claims and appended drawings.

SUMMARY OF THE INVENTION

The down hole pulser is shown packaged in the shuttle form but may be employed in the installed form by securing the housing to the pulser body.

The body of the shuttle package is movable through the drill string bore from the surface to a locator in the housing which serves as a segment of the drill string. An orifice is situated in the housing and cooperates with a poppet extending from the lower end of the body to form the signal valve. The poppet is tubular with the bore arranged to conduct fluid pressure from the downstream side of the orifice to the upper face of a piston attached to the poppet. The body has openings upstream of the orifice with channels to direct fluid pressure upstream of the orifice to the opposed, lower, face of the poppet piston. The poppet piston has more effective sectional area than the poppet at the signal valve end. The piston, then, applies an upward force on the poppet proportional to the pressure drop across the orifice. A spring is arranged to urge the poppet toward the orifice and is of sufficient strength to provide the needed operating pressure for the pulser when it is in the off-pulse state.

To move the poppet toward the orifice to create a pulse a servo channel is opened for fluid pressure above the orifice to flow to the cylinder above the piston. That channel is opened by a servo valve and includes a pressure relief valve with the relief flow directed to the poppet bore. The back pressure, now limited, is conducted to the cylinder above the piston. The piston moves toward the orifice until the forces on the piston are balanced at the preselected pressure drop across the signal valve.

To open and close the servo valve in response to signals from the down hole instrument the servo poppet is attached to an operating rod that extends to a latch mechanism controlled by a solenoid which is powered by the signal. The latch automatically engages the rod when it reaches the poppet closed position and when it reaches the open position. The latch will release the rod when the rod is sufficiently urged to move away from the engaged position unless the solenoid acts to secure the latch in the engaged position. The solenoid is spring biased to secure one position, preferably the servo valve closed position. That position will then be retained indefinitely, for a fail safe situation, until the solenoid is energized. When the solenoid is energized the rod is free to move to the servo open, or on-pulse, position. The latch automatically holds the rod in that position until the solenoid is actuated by dropping the signal current to the solenoid, allowing the spring to return the solenoid to the extended position common to solenoids.

The operating rod is always urged to move to the alternate position when it arrives at either position by the effect that action has upon the pressure differential produced by the signal valve. To move the rod it is attached to a servo actuator piston with one face exposed to the pressure upstream of the orifice and the opposing face exposed to the regulated pressure urging the poppet piston toward the orifice of the signal valve. The signal valve increases signal pressure when the servo valve is open and reduces signal pressure to a preset, or operating pressure, when the servo valve is closed. The rod operating piston is situated to close the servo valve when signal pressure is highest and it is sufficiently spring biased toward servo open state to overcome the operating pressure produced force. Without the latch mechanism, the signal valve would oscillate continually between the two states.

The shuttle body encloses and protects the necessary batteries and the down hole instrument, neither of which are presented as novelty herein.

Solenoids operating in drill strings subject to vibration and shock induced acceleration must either have enough armature holding ability to stay in a selected state, closed or open, in the acceleration field or be compensated to avoid the acceleration effect which may be one hundred times the mass of the armature and directly carried structure. Holding force represents electrical energy and shuttle pulsers cannot carry enough batteries to sustain that condition for an acceptable duration. The compensator shown in block form is in the art and a subject of U.S. Pat. 5,020,609, issued in June, 1991. It is connected directly to the armature solenoid.

BRIEF DESCRIPTION OF DRAWINGS

In the drawings wherein like features have the same captions, FIG. 1 is a side elevation, mostly cut away, of the preferred embodiment.

FIG. 2 is identical to FIG. 1 with the various moving elements in the alternate positions.

DETAILED DESCRIPTION OF DRAWINGS

Figure 3:
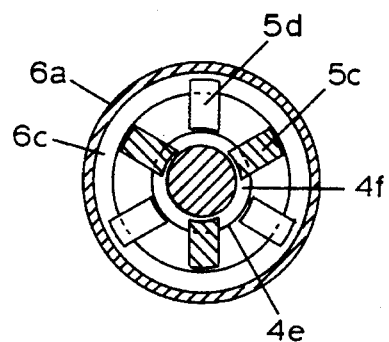
FIG. 3 is a sectional view, somewhat enlarged, taken along line 3–3 of FIG. 1.

In the drawings some features pertaining to manufacturing and maintenance utility, well established in the art and not bearing upon points of novelty, are omitted in the interest of descriptive efficiency and clarity. Omitted features include such as weld lines, some threaded junctures, communication and power wiring, galleries for fluid and wiring, and retaining rings and pins. A plurality of elements assembled to comprise a a functional structure may be shown as a single member.

In FIG. 1, housing 1 is a length of drill string with means at the top and bottom (not shown) for fluid tight attachment to continuing drill string lengths. It is adapted to accept and position the shuttle pulser body 2 in the landing baffle 1c. In the proximity of the baffle orifice 1e is situated to cooperate with signal poppet 3 to form a signal valve. The signal valve changes the resistance to fluid flow through the orifice to generate fluid pressure signals that can be detected at the surface to determine the nature of information produced by the down hole instrument 14.

Drilling fluid moving down bore 1a is only slightly impeded by stabilizer fins 1b and baffle support webs 1f, converges to flow through orifice 1e and continues down bore 1g to exit, usually through a drill head into the well bore.

Poppet 3, axially movable in bore 2d, is fitted with piston 3b, and has bore 3a. Bore 3a opens just above the orifice and senses the pressure downstream of the orifice either by moving below the orifice, on pulse generation, or senses the velocity head that produces the drop across the orifice. The variance from the actual downstream pressure has been found to be rather small for some distance of the poppet opening above the orifice.

Body 2 has a spear point 2n on top for wire line manipulation along the drill string bore. Down hole instrument 14, battery pack 13 and acceleration compensator 12, all in much shortened scale are normally carried by the shuttle body. They are not part of the points of novelty, are established in the art, and are not detailed.

Axial movement of poppet 3 is determined by spring 10 in cylinder 2d, pressure on the lower face of the piston conducted by ports 2f, and pressure on top of the piston. Pressure on top of the piston is derived in one of two ways. To create a pulse, servo poppet 4c is opened to admit upstream pressure entering screens 2j, flowing through duct 2g, and out ports 9d. The pressure atop the piston is limited by regulator 9 which is a spring and ball relief valve. At a preselected pressure, spring 9e compresses to allow flow around ball 9a, through channel 9f to the downstream end of the poppet bore 3a.

When servo poppet 4c closes duct 2g the piston moves upward. Fluid displaced from cylinder 2d flows by the substantial leak route past the piston and between tube 9c and bore 3a. These leaks are desirable for desilting purposes and have little effect upon flow available through duct 2g. Duct 2g is a flow resistor that limits the available flow to make the pressure regulator effective. When higher cyclic rates are required of the pulser a more rapid opening of the signal valve is desirable. A dump valve is described later herein to speed up the venting of cylinder 2d. An optional leak port 2k may be sized to yield the desired vent rate.

To provide power for movement of the servo popper without battery drain annular piston 4b is directly attached to the poppet. The upper end of the piston is exposed to fluid pressure upstream of the orifice by way of screen 2j and the lower end is exposed to pressure in annular cylinder 2h by way of ports 2m. The pressure at ports 2f and screens 2j are nearly equal. Fluid pressure in bore 1g is the lowest in the system, approximated by the pressure in bore 3a whether on pulse or off pulse and is usually referred to as the base pressure and is defined as zero to consider system pressure differentials and their effects.

Spring 10 is usually selected to deliver an operating pressure of forty psi across orifice 1e at flows above an expected minimum for the well operations when the servo is closed. Spring 9e is selected to deliver enough pressure atop piston 3b to cause the signal valve to deliver a signal pulse pressure of 160 psi, or 120 psi above the operating pressure when the servo is open. Different differentials are used for different purposes such as great depth of wells and preferred high signal cyclic rates. Those cited above are practical general purpose values. The pressure in cylinder 2d is about sixty psi when the servo is open (on pulse) and approaches zero when the servo valve is closed (off pulse). Piston 4b then has a pressure differential, always urging it downward, of forty psi off pulse and one hundred psi on pulse.

To urge the servo poppet to always change the existing state, spring 11 is selected to urge the piston 4b upward with a force half the difference between the force produced by that piston in the two states. Otherwise stated spring 11 produces a force equal to the piston force at a seventy psi differential. If unlatched, then, the piston 4b would move upward when off pulse and downward when on pulse. In either state, then, the servo is urged to move to the alternate state from either state occupied. The system is self energizing when drilling fluid flow is initiated. The latch system is then in control of change of state.

Latch 6 is shown in the fail on pulse configuration. This is preferred when the operator prefers to trip the string when the pulser fails to deliver information. Alternative configurations will be described later herein. Operating rod 4e, attached to the servo poppet, extends through the oil separator piston 8, which also serves as a hydrostatic pressure equalizer, into the latch. It has groove 4f to be engaged by collet latch heads 5c or 5d. The collet is constructed with the latch normal positions engaging the groove. The groove and latch heads 5c and 5d are beveled at the points of engagement, are supported and biased into the groove by spring bars 5b and 5a respectively, and piston 4b will pull or push the rod out of latch engagement unless buttress rings 6c or 6b engage their respective latch head while it is in the groove. Latch carrier 6a is directly attached to the solenoid armature which is biased downward by an internal spring (not shown). With no signal energizing the solenoid ring 6b will secure head 5d in the groove when the rod arrives at the upper state in which the servo valve is open. When a signal to the solenoid moves the armature upward ring 6b will release latch head 5d before ring 6c reaches and is stopped by the displaced head 5c. When the rod moves downward to allow head 5c to engage groove 4f, the carrier will finish its upward stroke, securing the rod in the state closing the servo valve. The holding ability of a solenoid with no gap in the field (closed) is quite large compared to the pull in force with the armature extended and the instrument greatly reduces the current to the solenoid while securing the off pulse state. The acceleration compensator 12, directly connected to the armature of solenoid 7 by rod 7b, neutralizes the acceleration forces produced by shock and vibration along the solenoid axis caused by drilling. The low holding current required in the pulse on failure configuration is not prohibitive and acceleration will not release the latch.

FIG. 3, a section taken along line 3 of FIG. 1, with the housing portion omitted, shows rod 4e with groove 4f engaged by latch heads 5c confined by ring 6c of latch shuttle 6a. The rod is in the servo closed state shown in FIG. 2 with latch heads 5d forced outward.

Figure 4:
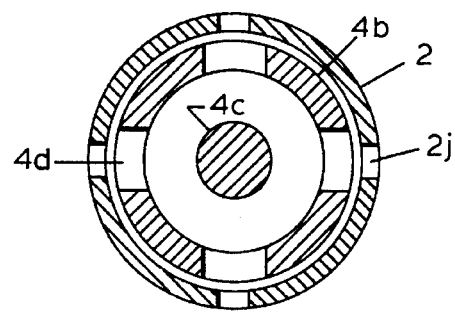
FIG. 4 is a sectional view of the embodiment of FIG. 1 taken along line 4–4.

FIG. 4 is a section taken along line 4–4 of FIG. 1, with the housing portion omitted, showing the porting for fluid flow from outside the shuttle body to the channel 2g, not visible below poppet 4c. The windows 4d and screen holes 2j do not have to remain in registry because there is adequate flow area between the body and piston 4b.

Figure 5:
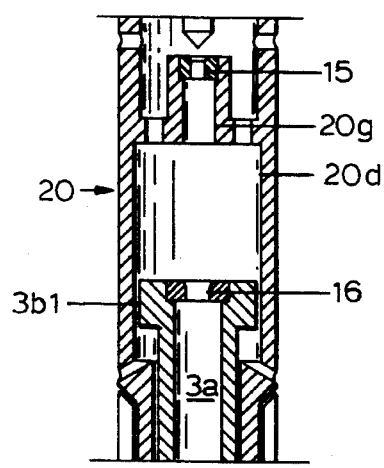
FIG. 5 is an elevation in cut away of an alternate embodiment of a selected area of the apparatus of FIGS. 1 and 2.

FIG. 5 is an alternate embodiment of the body eliminating the regulator valve 9. Spring 10 and piston 4b will be used but are omitted for clarity. The body 20 is somewhat changed from FIG. 1 by detaching the assembly element containing the regulator 9. Piston 3b1 is fitted with an orifice 16. The ratio of pressure drops across the orifices 15 and 16 is such that pressure above piston 33b1, in conjunction with spring 10 (not shown), causes the poppet to move to the lower travel limit when the servo is open. The signal pressure generated by the signal valve (see FIG. 1) will not be regulated but will be proportional to drilling fluid flow. This arrangement is normally used when the drilling fluid flow is known in advance of the pulser use. This simple system is normally used when information is spooled by the instrument while drilling but only transmitted by the pulser while drilling is stopped and flow can be set for best communication.

Figure 6:
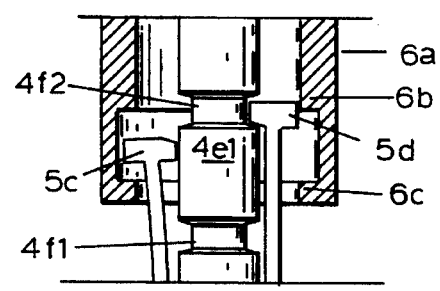
FIG. 6 is an elevation, mostly cut away, of an alternate latch configuration for a selected area of FIGS. 1 and 2.

FIG. 6, an enlarged view of the latch 6, shows the usual alternate to the latching arrangement shown in FIGS. 1 and 2. Shuttle 6a is unchanged and is normally biased downward to the position shown by a spring in the solenoid assembly. This is the fail off pulse configuration with head 5d secured in groove 4f2. When the solenoid is energized the shuttle 6a is moved upward to release latch head 5d. It is briefly stopped by the head 5c until the groove 4f1 arrives in registry, When head 5c moves into the groove the shuttle completes its stroke and holds the head in place with the reduced diameter of ring 6c.

Figure 7:
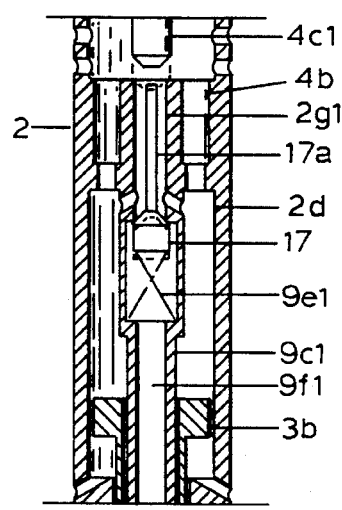
FIG. 7 is an elevation, mostly cut away, of a selected area of the embodiment of FIG. 1 with an alternate feature.

FIG. 7, an alternate body configuration, shows an arrangement for rapidly dumping fluid from above the poppet piston when a high pulse repetition rate is needed. The regulator valve enclosure is unchanged but the usual ball is replaced by valve element 17. Servo poppet 4c1 has a blunt end to engage probe 17a to force the valve element 17 to open when the poppet closes channel 2g1. Operation of all parts is otherwise the same as that for FIGS. 1 and 2.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the tool of this invention without departing from the scope thereof, it is to be understood that all matter herein set forth or shown in the accompanying drawings is to be interpreted as illustrative and not in a limiting sense.

The invention having been described, I claim:

1. A pressure pulse signal generator for use in drill strings in well bore operations to generate signal pulses in a stream of drilling fluid moving in the drill string bore that are detectable at the surface to detect information encoded in the pulse time related signal distribution, comprising:

a) a housing adapted for use as a length of the drill string with means at each end for fluid tight attachment to a continuing drill string, a flow path for said stream between said ends, and having means to support a pulser body therein;

b) a body situated in said housing and arranged to contain a battery, a down hole instrument, and means to control and actuate a signal valve to change resistance to the flow of said stream;

c) a signal valve, arranged to move between an open state and a closed state, situated in said housing, arranged to change the resistance to flow of said stream, comprising a first spring to bias said valve toward said closed state and a power cylinder responsive to the pressure difference across said signal valve arranged to move said valve toward said open state with a force proportional to said pressure difference;

d) first fluid channel means to conduct fluid from the downstream side of said signal valve to said cylinder to urge said signal valve toward said closed state, second fluid channel means arranged to conduct fluid from the upstream side of said signal valve to said cylinder to urge said signal valve toward said open state, and third channel means arranged to conduct fluid pressure from the upstream side of said signal valve to said cylinder to urge said signal valve toward said closed state;

e) a servo valve situated to open and close said third channel, comprising a second spring arranged to urge said servo valve toward a second open state and a second power cylinder responsive to pressure difference across said signal valve to urge said servo valve toward a second closed state with a force proportional to said pressure difference; and f) a first flow restrictor in said first channel and a second flow restrictor in said third channel, the ratio of flow resistances of said two restrictors such that, when said servo valve is open, said piston moves toward said closed state;

g) releasable, solenoid operated, latch means arranged to automatically secure said servo valve in each said second state when it arrives at that state, responsive to signals from said down hole instrument to release said servo valve from said secured state;

said first spring selected to cause a preselected operating pressure differential across said signal valve to put the pulser in motion when said servo valve is opened; said second spring selected to overcome said second piston and urge said servo valve toward said second open state when said operating pressure exists across said orifice and to be overcome by said second piston and to permit movement of said servo toward said second closed state when signal pressure exists across said signal valve, said signal pressure being a preselected amount greater than said operating pressure.

2. The pulser of claim 1 wherein said means to support comprises a landing baffle to position said body delivered through the drill string bore.

3. The pulser of claim 1 wherein said signal valve comprises an orifice in said path arranged to accept at least part of said stream, and a popper extending from said body, movable toward and away from said orifice, to variably resist the flow of said stream through said orifice.

4. The pulser of claim 3 wherein said poppet is tubular, said power cylinder comprising a piston on said poppet situated in a cooperating cylinder in said body, said first channel means comprising the bore axially extending through said poppet to open into said cylinder to act upon a face of said piston farthest from said orifice, said second channel comprising ports in said body opening into said path upstream of said orifice and into said cylinder to act upon the face of said piston nearest to said orifice, said first spring situated in said cylinder acting against said poppet.

5. The pulser of claim 1 wherein said first resistor comprises a pressure regulator valve arranged to impede flow into said first channel, from said cylinder, at pressure less than a preselected amount.

6. The pulser of claim 1 wherein said body is arranged to carry said down hole instrument and said battery with associated wiring therebetween and to said solenoid.

7. A pressure pulse signal generator for use in drill strings in well bore operations to generate signal pulses in drilling fluid stream moving in the drill string bore that are detectable at the surface to detect information encoded in the pulse time related signal distribution, comprising:

a) a housing adapted to perform as a length of drill string with means at each end for fluid tight attachment to a continuing drill string, a generally central bore to conduct said stream between said ends, an orifice with an upstream and a downstream side arranged to accept at least part of said stream, and a landing baffle to support a removable pulser shuttle body delivered along said bore;

b) a body adapted to engage said baffle, containing a power cylinder having an actuator rod extending from an end of said body situated to act as a poppet to cooperate with said orifice to variably resist the flow of said stream to provide pressure change signals in said flow, and a first spring to urge said poppet toward said orifice;

c) a first fluid channel opening at the end of said poppet and extending axially therethrough, with a first flow restrictor, to open in said cylinder on the upstream side of said piston, a second channel opening from said body into said stream upstream of said orifice and opening into said cylinder on the downstream side of said piston, and a third fluid channel opening into said stream upstream of said orifice, having a second flow restrictor, and opening into said cylinder to said upstream side of said piston;

d) a servo valve arranged to control flow of fluid through said third passage, movable between an open state and a closed state, comprising a second spring to urge said servo valve to said open state and a piston in a cooperating bore with fluid channels extending from the upstream side of said cylinder and said stream upstream of said orifice arranged to urge said servo valve toward said closed state with a force proportional to the pressure difference between said upstream end of said cylinder and said stream upstream of said orifice;

e) solenoid operated latch means, responsive to signals from a down hole instrument to automatically and releasably secure said servo valve in each said state when it arrives at that state and to release said servo valve in response to said signals;

said first spring selected to cause a preselected operating pressure drop to exist across said orifice when said third channel is closed, said second spring selected to overcome said second piston and open said servo valve when said operating pressure exists across said orifice and to be overcome by said second piston to permit said servo valve to be closed when a signal pressure drop, a preselected amount larger than said operating pressure, exists across said orifice;

said flow restrictors selected to cause a pressure increase on the upstream side of said first piston, when said servo valve is open, to move said poppet toward said orifice.

8. The pulser of claim 7 wherein said body contains a down hole instrument, and batteries, with associated wiring therebetween, and wiring to said solenoid.

9. The pulser of claim 1 wherein said first resistor comprises a pressure regulator valve arranged to impede flow into said first channel, from said cylinder, at pressure less than a preselected amount.

10. The pulser of claim 9 wherein said regulator valve is arranged to cooperate with said servo valve to be forced open when said servo valve moves to said closed state.

11. The pulser of claim 5 wherein said regulator valve is arranged to cooperate with said servo valve to be forced open when said servo valve moves to said second closed state.

* * * * *